(12) United States Patent
Jang

(10) Patent No.: US 12,164,727 B2
(45) Date of Patent: Dec. 10, 2024

(54) TOUCH SENSING DEVICE, TOUCH SENSING METHOD, AND DISPLAY DEVICE

(71) Applicant: LX SEMICON CO., LTD., Daejeon (KR)

(72) Inventor: Moon Ho Jang, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/355,942

(22) Filed: Jul. 20, 2023

(65) Prior Publication Data

US 2024/0028160 A1    Jan. 25, 2024

(30) Foreign Application Priority Data

Jul. 21, 2022  (KR) .................. 10-2022-0090545
Nov. 21, 2022  (KR) .................. 10-2022-0156472

(51) Int. Cl.
*G06F 3/041*  (2006.01)
*G06F 3/0354*  (2013.01)
*G06F 3/044*  (2006.01)

(52) U.S. Cl.
CPC ...... *G06F 3/04184* (2019.05); *G06F 3/03545* (2013.01)

(58) Field of Classification Search
CPC .............................. G06F 3/0412; G06F 3/0446
See application file for complete search history.

(56) References Cited

U.S. PATENT DOCUMENTS

| 2013/0222295 A1* | 8/2013 | Lim ..................... G06F 3/04883 345/173 |
| 2017/0131829 A1* | 5/2017 | Takahashi ........... G06F 3/04182 |
| 2021/0124473 A1 | 4/2021 | Kim et al. |
| 2021/0405847 A1 | 12/2021 | Choi et al. |

OTHER PUBLICATIONS

European Search Report issued for European Patent Application No. 23186782.1 dated Dec. 13, 2023, 12 pages.

* cited by examiner

*Primary Examiner* — Nan-Ying Yang
(74) *Attorney, Agent, or Firm* — ROTHWELL, FIGG, ERNST & MANBECK, P.C.

(57) ABSTRACT

An embodiment relates to a touch sensing device for sensing a touch by using touch electrodes disposed on a display panel. The touch sensing device can generate a touch synchronization signal based on a starting time point of a touch frame and output a touch driving signal for sensing a touch to a panel based on the generated touch synchronization signal.

20 Claims, 10 Drawing Sheets

TOUCH SENSING DEVICE, TOUCH SENSING METHOD, AND DISPLAY DEVICE

CROSS-REFERENCE TO RELATED APPLICATIONS

This application claims the benefit of priority from Korean Patent Application No. 10-2022-0090545, filed Jul. 21, 2022, and Korean Patent Application No. 10-2022-0156472, filed Nov. 21, 2022, the entire contents of which are incorporated herein by reference.

BACKGROUND

1. The Field

An embodiment relates to a touch sensing device, a touch sensing method, and a display device.

2. Background

As informatization progresses, various display devices capable of visualizing information are being developed. A liquid crystal display (LCD) display device, an organic light emitting diode (OLED) display device, a plasma display panel (PDP) display device, etc. are developed or are being developed. These display devices are evolving to properly display high-resolution images.

Display panels configured in various electronic devices (e.g., TV, laptop, mobile device, etc.) employ a lot of touch functions. In this case, the display panel is implemented as a flat panel display device, and the touch function can be implemented as a touch panel combined with the display panel. A touch panel refers to a panel having a function of operating an equipment or executing a program as the user presses text, image, or icon, etc.

The touch panel is configured to perform touch recognition capacitively, for example. As an example of a touch panel for implementing capacitive touch recognition, a "mutual-capacitance touch sensing device" has been proposed. As an example, the touch panel can have a configuration independent of the display panel and can be manufactured separately so that it is combined with the display panel. As described above, the configuration in which the touch panel and the display panel are combined causes various difficulties such as complexity of the process and increase in manufacturing cost.

In order to solve this problem, development of a device in which components for display and components for touch recognition can be shared is being promoted. A typical example is an in-cell scheme. The in-cell scheme implements touch recognition by having a configuration for implementing a touch function in pixels of a display panel, and has been developed in various ways. A pixel implemented in the in-cell scheme can have a function of implementing display and touch recognition in parallel. For example, in a device that provides both the touch function and the display function (hereinafter, referred to as a 'display device'), a touch operation and a display operation can be operated in a time division scheme using a display driving signal and a touch driving signal.

According to an embodiment, a time interval of a touch frame can be fixed in order to identify an active pen based on a standard determined in a touch panel. As the time interval of the touch frame is fixed, the time interval of the touch frame and the time interval of the display frame may not match each other. When the touch frame and the display frame do not match each other, display noise can occur. Also, since the touch frame and the display frame do not match each other, an area where display noise occurs can vary. Accordingly, a problem in which the entire display area is vulnerable to noise can occur.

Therefore, there is a demand for a method for reducing display noise in a display device including a touch panel for identifying an active pen.

BRIEF SUMMARY

Against this background, one object of the embodiment is to provide a touch sensing device, a sensing method and display device capable of reducing display noise by matching a touch frame and a display frame to each other regardless of a communication protocol set for the active pen in a state in which the touch of the active pen is not confirmed.

According to one aspect of the embodiment, a touch sensing device, comprising: a touch driving circuit configured to generate a touch driving signal at a time interval corresponding to a synchronization signal of a display frame; and a touch electrode of a panel, the touch electrode being configured to be driven by the touch driving signal and configured to sense an object, wherein the touch driving circuit is configured to generate the touch driving signal at a time interval corresponding to a predetermined first cycle in response to a touch of a first object on the panel.

According to another aspect of the embodiment, a touch sensing method, comprising: confirming that the first object is touched from signals sensed through the touch electrodes; adjusting a starting time point of a touch frame based on whether the first object is touched; generating a touch synchronization signal based on the starting time point of the adjusted touch frame; and generating a touch driving signal for sensing a touch based on the touch synchronization signal.

According to another aspect of the embodiment, a display device, comprising: a panel comprising touch electrodes; a touch control circuit configured to adjust a starting time point of a touch frame based on whether a first object is touched from signals sensed through the touch electrodes and to generate a touch synchronization signal based on the adjusted starting time point of the touch frame; and a driving signal output circuit configured to output a touch driving signal for sensing a touch and a display driving signal based on the touch synchronization signal generated by the touch control circuit.

As described above, according to the embodiment, in a state in which the touch of the active pen is confirmed, the touch frame is determined according to the standard for the active pen, and in a state in which the touch of the active pen is not confirmed, the touch frame and the display frame are matched with each other regardless of the standard for the active pen so that display noise can be reduced.

DETAILED DESCRIPTION

A touch sensing device (e.g., a touch display device or a display device) According to an embodiment can perform display and touch sensing (or touch recognition) in a time division scheme. A touch sensing device According to an embodiment can comprise a configuration in which components for a display and components for recognizing a touch are shared in a built-in in-cell manner. However, embodiments are not limited to the time division scheme or the in-cell scheme. For example, the touch display device of embodiments to be described later can be implemented in an external type or an on-cell method among a built-in type.

According to various embodiments, display and touch recognition of a touch display device can be implemented as separate operations. Here, the display can mean displaying an image by driving pixels of a display panel. The touch recognition can mean recognizing a touch location on a display panel. The time division scheme can mean that display and touch recognition are alternately performed sequentially for each time domain.

More specifically, the time division scheme can be implemented such that display and touch recognition alternate in units of frames constituting an image. That is, display and touch recognition can be sequentially and alternately performed corresponding to a plurality of frames constituting an image. In addition, in the time division scheme, two or more touch recognitions can be performed within each frame constituting an image.

The in-cell method can mean that display and touch recognition can be simultaneously performed on pixels in a display panel. For this purpose, a shared component that can provide capacitance for touch recognition can be used and can comprise at least a connection point of the component. An example of the connection point can be a node (COM) for applying a common voltage, but may not be limited thereto. That is, various components can be used as the connection point according to the manufacturer's intention.

Figure 1:
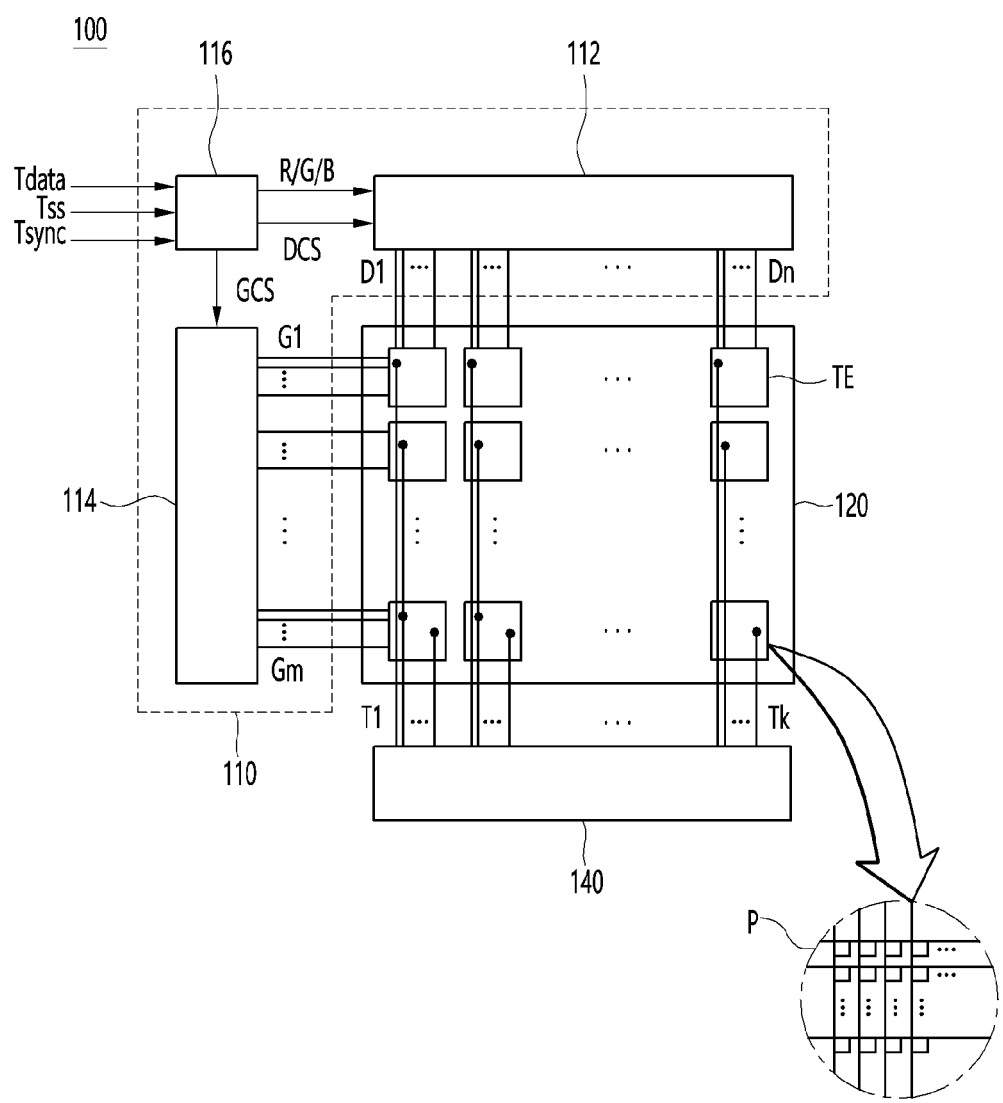
FIG. 1 is a block diagram of a display device according to an embodiment.

FIG. 1 is a block diagram of a display device according to an embodiment. As shown in FIG. 1, the display device 100 according to the embodiment can perform a display function and a touch sensing function. The display device 100 according to the embodiment can be implemented as a flat panel display such as a liquid crystal display (LCD) display, a light emitting diode (LED) display or an organic light emitting diode (OLED) display. Embodiments described later illustrate LCD displays, but are not limited thereto. That is, the same or similar can be applied to displays based on LED display or OLED display.

In an embodiment, the display device 100 can comprise a capacitive touch panel integrally implemented therein to sense touch by contact of a conductive object such as a hand (or finger) or an active pen (or electronic pen). Such a touch panel can be configured in a form independent of a display panel for display implementation, or can be embedded in a pixel array of a display panel.

As shown in FIG. 1, The display device 100 according to an embodiment can comprise a panel driving device 110, a panel 120 and a touch sensing device 140. The panel 120 can comprise, for example, a display panel or a touch panel. The touch sensing device 140 can comprise, for example, a touch driving circuit, a touch sensing circuitry, a touch controller, a touch micro controller unit (MCU), etc.

The panel 120 can display an image of a predetermined gray level or receive a touch input by a hand or an active pen. The panel 120 can comprise a display panel having an in-cell touch type structure using a capacitance scheme. In an embodiment, the panel 120 can comprise an in-cell touch type display panel using a self-capacitance scheme or an in-cell touch type display panel using a mutual-capacitance scheme. Hereinafter, for convenience of description, it will be assumed that the panel 120 is a self-capacitance in-cell touch type display panel.

The panel 120 can operate in a display mode and a touch sensing mode. The panel 120 can display an image during the display mode and serve as a touch panel for touch sensing during the touch sensing mode.

The panel driving device 110 can comprise a data driver 112, a gate driver 114, and a timing controller 116. The data driver 112 can comprise, for example, a data driving circuit, a source driver circuit, a source driver integrated circuit (SDIC), a display driving circuit, etc. The timing controller 116 can comprise, for example, a controller, a control unit, and a T-CON. Each of the data driver 112, the gate driver 114, and the touch sensing device 140 can drive at least one included in the panel 120.

The data driver 112 can drive the data lines DL (e.g., D1 to Dn) connected to a pixel P (or a sub-pixel SP). The gate driver 114 can drive the gate lines GL (for example, G1 to Gm) connected to the pixel P (or the sub-pixel SP). The touch sensing device 140 can drive the electrode EL or the touch electrode TE disposed on the panel 120.

The data driver 112 can supply data voltages to the data lines DL to display an image on each pixel P of the panel 120. The data driver 112 can comprise at least one data driver integrated circuit. The data driver IC can be connected to the bonding pad of the panel 120 using a tape automated bonding (TAB) scheme or a chip on glass (COG) scheme. The data driver IC can be directly formed on the panel 120. In some cases, the data driver IC can be integrated into the panel 120. Meanwhile, the data driver 112 can be implemented in a chip on film (COF) scheme.

The gate driver 114 can supply scan signals to the gate lines GL to turn on/off a switch (e.g., transistor) positioned in each pixel P. Depending on the driving scheme, the gate driver 114 can be located on only one side of the panel 120 as shown in FIG. 1 or can be divided into two and located on both sides of the panel 120. The gate driver 114 can comprise at least one gate driver integrated circuit. The gate driver integrated circuit can be connected to the bonding pad of the panel 120 using a tape automated bonding (TAB) scheme or a chip on glass (COG) scheme, or directly formed on the panel 120 by implementing a gate in panel (GIP) type. In some cases, the gate driver integrated circuit can be formed by being integrated on the panel 120. Meanwhile, the gate driver 114 can be implemented in a chip on film (COF) scheme.

The panel 120 can comprise only a touch screen panel (TSP) and can further comprise a display panel. Here, the touch panel and the display panel can share some components with each other. For example, a touch electrode TE for sensing a touch in a touch panel can be used as a common voltage electrode supplied with a common voltage in a display panel. In view of the fact that some components of the display panel and the touch panel are shared with each other, such a panel 120 is also referred to as an integrated panel, but the embodiment is not limited thereto. In addition, although an in-cell type panel is known as a form in which a display panel and a touch panel are integrally combined, this is just one example of the aforementioned panel 120, and the panel to which the present invention is applied is not limited to such an in-cell type panel.

Meanwhile, a plurality of touch electrodes TE can be disposed on the panel 120, and the touch sensing device 140 can drive the touch electrode TE using a touch driving signal. The touch sensing device 140 can generate a sensing value for the touch electrode TE according to a response signal formed on the touch electrode TE in response to the touch driving signal. The touch sensing device 140 can calculate touch coordinates using sensing values of the plurality of touch electrodes TE disposed on the panel 120. The calculated touch coordinates can be transmitted to and utilized by another device (e.g., host, controller or processor).

In the embodiment, the pixel P can comprise a transistor (e.g., TFT), a liquid crystal (LC), and a common voltage electrode (VCOM). A gate terminal of the transistor TFT can be connected to the gate line GL, a drain terminal can be connected to the data line DL, and a source terminal can be connected to the liquid crystal LC.

When the scan signal SCAN corresponding to the turn-on voltage is supplied to the gate terminal through the gate line GL, the drain terminal and the source terminal of the transistor TFT can be conducted and the data voltage Vdata can be supplied to the liquid crystal LC. A common voltage can be supplied to the common voltage electrode VCOM. Accordingly, the brightness of the pixel P can be adjusted while the liquid crystal LC is controlled according to the difference between the common voltage and the data voltage Vdata.

Meanwhile, the common voltage electrode VCOM can be the same electrode as the touch electrode TE driven by the touch sensing device (140 in FIG. 1) described with reference to FIG. 1. It has been described as an example, but the embodiments are not limited thereto.

According to an embodiment, the touch sensing device 140 can drive the touch electrode TE using the touch driving signal Stx, and sense a touch or proximity of an external object OBJ on the panel 120 according to the response signal Srx formed on the touch electrode TE in response to the touch driving signal Stx.

At this time, the touch sensing device 140 can adopt a capacitive touch scheme that recognizes the proximity or touch of the object OBJ by sensing the capacitance or capacitance change of the touch electrode TE.

Such a capacitive touch scheme can be divided into, for example, a mutual-capacitance touch scheme and a self-capacitance touch scheme. In the mutual-capacitance touch scheme, which is a type of capacitive touch scheme, a touch driving signal Stx can be applied to one touch electrode and another touch electrode mutually coupled with the one touch electrode can be sensed. In this mutual-capacitance touch scheme, a value sensed by another touch electrode can vary according to a touch or proximity of an object OBJ such as a finger or a pen (e.g., an active pen). The mutual-capacitance touch scheme can detect the presence or absence of touch, touch coordinates, etc. using these sensed values.

In the self-capacitance touch scheme, which is another type of capacitive touch scheme, a touch driving signal Stx is applied to one touch electrode and then the corresponding touch electrode is sensed again. In this self-capacitance touch scheme, a value sensed by a corresponding touch electrode can vary according to a touch or proximity of an object OBJ such as a finger or a pen. The self-capacitance touch scheme can detect the presence or absence of touch, touch coordinates, etc. using these sensed values. In this self-capacitance touch scheme, the touch electrode for applying the touch driving signal Stx and the touch electrode for sensing can be the same. The embodiment can be applied to the mutual-capacitance touch scheme or the self-capacitance touch scheme. In some examples below, a case in which the embodiment is applied to a self-capacitive touch scheme is described for convenience of explanation.

According to an embodiment, the timing controller 116 can be configured to provide a display control signal to the data driver 112 and the gate driver 114 and provide a touch control signal to the touch sensing device 140 so that the display and touch recognition can be performed in a time division scheme.

The timing controller 116 can output a control signal such as a source control signal, a gate control signal, a clock pulse, a horizontal synchronization signal, a vertical synchronization signal, and a switching signal SW as the display control signal.

The data driver 112 can be configured to receive a source control signal included in the display control signal, generate a data driving signal corresponding to the source control signal to provide the data driving signal to the pixels P of the panel 120. The data driver 112 can typically comprise a latch, a digital-to-analog converter, and an output buffer. Here, the latch can store data according to the source control signal to provides the data to the digital-to-analog converter, and the digital-to-analog converter can output an analog signal corresponding to an input data. The output buffer can transfer outputs of the digital-to-analog converter, that is, the analog signal, as the data driving signals to the pixels P of the panel 120 through the data lines DL.

The gate driver 114 can receive a gate control signal included in the display control signal, generate a gate driving signal corresponding to the gate control signal to provide the generated gate driving signal to the pixels P of the panel 120. The gate driver 114 can comprise an input buffer, a shift register, a level shifter, and an output buffer according to an embodiment. The input buffer can receive the gate control signal and output it to the shift register. The shift register can control scan pulses, which are gate signals transmitted through the input buffer, to be sequentially generated in units of rows of the panel 120. The level shifter can change an output voltage level of the shift register to have a level capable of turning on/off the thin film transistor (TFT) composed of the switches M. The output buffer can change signals output from the level shifter and output the changed signals as gate driving signals so as to drive the gate lines GL having an RC load.

Figure 2:
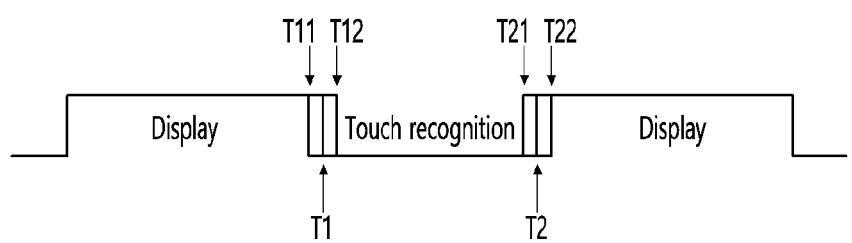
FIG. 2 is a timing diagram illustrating a method of driving a display device according to an embodiment.

FIG. 2 is a timing diagram illustrating a method of driving a display device according to an embodiment. Referring to FIG. 2, the above-described embodiment of FIG. 1 can be driven in a time division scheme by sequentially and alternately allocating display and touch recognition to successive time domains as shown in FIG. 2.

According to the embodiment, the timing controller 116 can provide a source control signal and a gate control signal to the data driver 112 and the gate driver 114, respectively, for display. The timing controller 116 can control not to activate an output of a touch driving signal TDS by providing a touch control signal to the touch sensing device 140 in the time domain set as the display interval. In FIG. 2, a time point T1 is a time point when entering a touch recognition state from a display state, and a time point T2 can be a time point when entering a display state from a touch recognition state.

According to an embodiment, the timing controller 116 can perform a control for touch recognition when a time set for displaying an image elapses. The timing controller 116 can activate the output of the touch driving signal TDS by providing a touch control signal to the touch sensing device 140 to perform touch recognition. Under the control of the timing controller 116, the touch driving signal TDS, which is a constant voltage, can be applied to a node of each pixel P. In the above configuration, the timing controller 116 switches the switch to a floating state at a time point T11 earlier than the time point T1 set as the time of entering the touch recognition state from the display state, or sets the switch to a floating state at a time T12 later than time T1 set as a time point for entering the touch recognition state in the display state.

Figure 3:
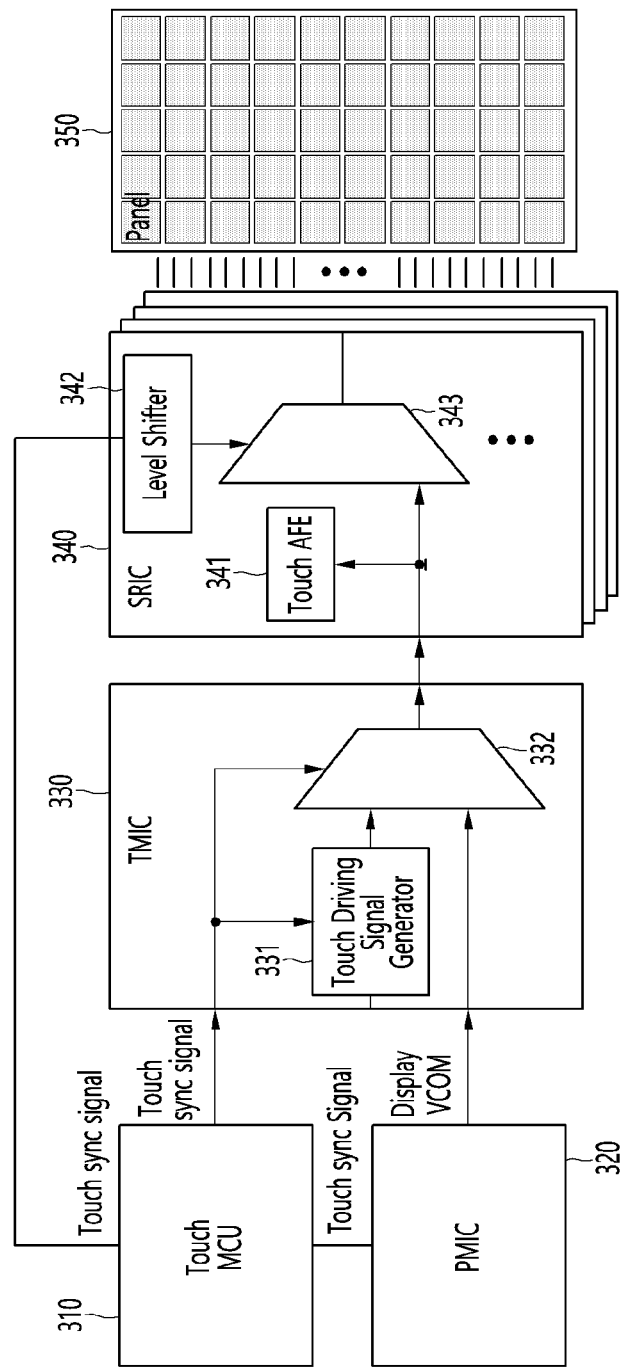
FIG. 3 is a detailed configuration diagram of a display device according to an embodiment.

FIG. 3 is a detailed configuration diagram of a display device according to an embodiment. Referring to FIG. 3, the touch display device can comprise a touch control circuit 310 (e.g., touch micro control unit (MCU)), a power management circuit 320 (e.g., power management IC (PMIC)), a touch driving circuit 330 (e.g., source driver and touch readout IC (SRIC)), a driving signal output circuit 340 (e.g., touch modulation IC (TMIC)), a driving signal output circuit 340 (e.g., source driver and touch readout IC (SRIC)), and a panel 350. Here, the power management circuit 320, the touch driving circuit 330, and the driving signal output circuit 340 can be referred to as a first circuit, a second circuit, and a third circuit, respectively.

The display device shown in FIG. 3 is only an example, and embodiments to be described later are not limited to the detailed configuration of FIG. 3.

According to the embodiment, the touch control circuit 310 can provide a synchronization signal to the power management circuit 320, the touch driving circuit 330, and the driving signal output circuit 340. The synchronization signal can comprise a synchronization signal for dividing a display interval or a touch sensing interval. The synchronization signal can be referred to as a display synchronization signal or a touch synchronization signal. The touch control circuit 310 can be configured to comprise at least some functions of the timing controller 116 shown in FIG. 1 or can be replaced with the timing controller 116.

According to an embodiment, the power management circuit 320 can receive a synchronization signal (e.g., a touch synchronization signal) from the touch control circuit 310 and output a display driving signal (display VCOM) based on the received synchronization signal. For example, the display driving signal can have a voltage of −1V, but this is only an example and is not limited thereto.

According to an embodiment, the touch driving circuit 330 can comprise a touch driving signal generator 331, a first multiplexer 332, etc. The touch driving circuit 330 can receive a synchronization signal from the touch control circuit 310 and generate a touch driving signal touch VCOM based on the received synchronization signal. For example, the touch driving signal generator 331 can generate a touch driving signal based on a synchronization signal (e.g., a touch synchronization signal) received from the touch control circuit 310. According to an embodiment, the touch driving signal can be configured in a pulse form having a voltage range of 1V to 4V.

The first multiplexer 332 of the touch driving circuit 330 can receive the touch driving signal output from the touch driving signal generator 331 and the display driving signal output from the power management circuit 320, and selectively output the touch driving signal or the display driving signal. For example, the first multiplexer 332 can selectively output one of the display driving signal and the touch driving signal based on the synchronization signal provided from the touch control circuit 310. For example, during a display interval in which an image is displayed on the panel 350, the first multiplexer 332 can output the display driving signal, and during a touch sensing interval in which a touch from the panel 350 is sensed, the first multiplexer 332 can output the display driving signal the touch driving signal.

The display driving signal or the touch driving signal output from the first multiplexer 332 of the touch driving circuit 330 can be transmitted to the driving signal output circuit 340. The touch driving circuit 330 can be configured to comprise at least some functions of the touch sensing device 140 shown in FIG. 1 or can be replaced with the touch sensing device 140.

According to an embodiment, the driving signal output circuit 340 can comprise a touch analog front end (AFE) 341, a level shifter 342, and a second multiplexer 343. According to an embodiment, the level shifter 342 of the driving signal output circuit 340 can receive a synchronization signal from the touch control circuit 310, and supply a VDD signal to the second multiplexer 343 based on the received synchronization signal. For example, a signal input to the second multiplexer 343 can comprise a display driving signal in a first voltage range and a touch driving signal in a second voltage range. The level shifter 342 can supply an HV level signal HVDD (e.g., 17V) to the second multiplexer 343.

The second multiplexer 343 of the driving signal output circuit 340 can selectively output a display driving signal in a first voltage range or a touch driving signa in a second voltage range based on the HV level signal HVDD supplied from the level shifter 342. Also, the second multiplexer 343 can comprise a channel multiplexer. The second multiplexer 343 can selectively output a display driving signal or a touch driving signal for each channel corresponding to each pixel of the panel 350. In the description of the embodiments to be described later, the function of the second multiplexer 343 selectively outputting a display driving signal or a touch driving signal for each channel will be omitted.

For example, during a display interval during which an image is displayed on the panel 350, the second multiplexer 343 can output a display driving signal to the panel 350. For example, during a touch sensing interval in which the second multiplexer 343 senses a touch from the panel 350, the second multiplexer 343 can output a touch driving signal to the panel 350. According to an embodiment, during the touch sensing interval, the second multiplexer 343 can receive a signal sensed from the panel 350 and supply it to the touch AFE 341. The touch AFE 341 or the touch control circuit 310 can determine whether or not there is a touch, the type of touch (e.g., a finger or an active pen), or the location of the touch based on the signal sensed from the panel 350.

Figure 4:
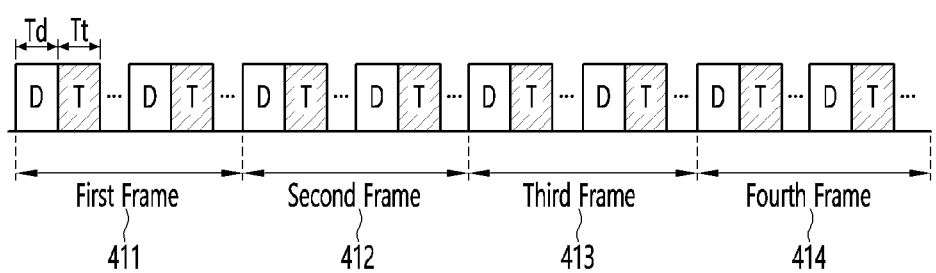
FIG. 4 is a diagram illustrating that a display interval and a touch sensing interval of a display device according to an embodiment are configured in a time division scheme.

FIG. 4 is a diagram illustrating that a display interval and a touch sensing interval of a display device according to an embodiment are configured in a time division scheme.

According to an embodiment, referring to FIG. 4, a display frame can comprise a plurality of display intervals and a plurality of touch sensing intervals. For example, each of the first frame 411, the second frame 412, the third frame 413, and the fourth frame 414 can correspond to one display frame. In each of the frames 411, 412, 413, and 414, the display interval Td indicated by 'D' and the touch sensing interval Tt indicated by 'T' can be alternately repeated. In the display interval Td in each of the frames 411, 412, 413, and 414, the data driver 112 can be configured to set to output a display driving signal to the panel 120. In the touch sensing interval Tt in each of the frames 411, 412, 413, and 414, the touch sensing device 140 can confirm whether there is a touch or the location of the touch (e.g., touch coordinates) by detecting a touch through touch sensing.

Figure 5:
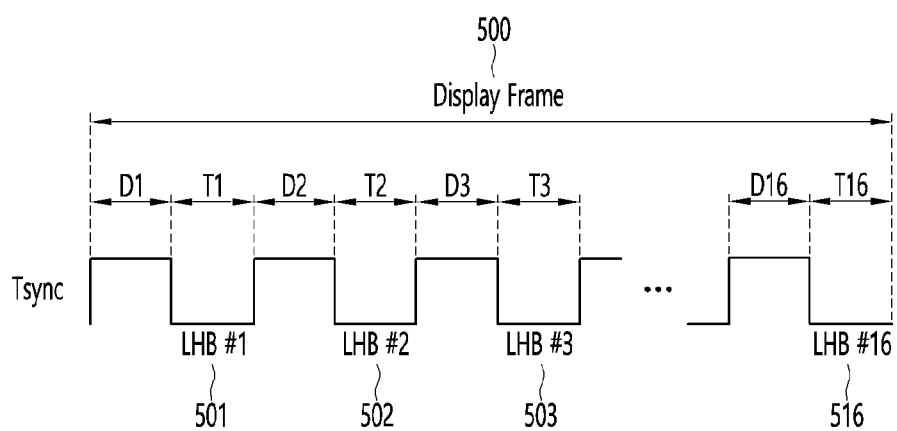
FIG. 5 is a diagram of a synchronization signal for defining a display interval and a touch sensing interval of a display device according to an embodiment.

FIG. 5 is a diagram of a synchronization signal for defining a display interval and a touch sensing interval of a display device according to an embodiment.

Referring to FIG. 5, the display device according to the embodiment can perform display driving for displaying a screen during a predetermined display driving interval (or display interval) (D1, D2, . . . , D16). The display device according to the embodiment can perform touch driving for sensing a touch input by a finger or an active pen (or stylus pen) during a predetermined touch driving interval (or touch sensing interval) (T1, T2, . . . , T16).

According to an embodiment, the display interval and the touch sensing interval can be temporally identical. According to the embodiment, the display interval and the touch sensing interval can be overlapping periods. According to the embodiment, the display interval and the touch sensing interval can be temporally separated periods. When the display interval and the touch sensing interval are temporally identical, display driving and touch driving can be simultaneously performed. On the other hand, when the display interval and the touch sensing interval are temporally separated periods, the display interval and the touch sensing interval can alternately performed.

According to the embodiment, when the display interval and the touch sensing interval are temporally separated while alternating, the touch sensing interval can correspond to a blank period in which the display driving is not performed. The display device can generate a touch synchronization signal Tsync that swings between a high level and a low level, and identify or control the display interval and the touch sensing interval through the touch synchronization signal Tsync. For example, the touch synchronization signal Tsync can be a driving timing control signal defining the touch sensing interval.

For example, a high level interval (or a low level interval) of the touch synchronization signal Tsync can correspond to the display interval. For example, a low level interval (or high level interval) of the touch synchronization signal Tsync can correspond to a touch sensing interval. As an example, in relation to a method of allocating the display interval and the touch sensing interval within one display frame period, one display frame period can be divided into one display interval and one touch sensing interval. At this time, display driving can proceed during one display interval, and touch driving for sensing a touch input by a finger or an active pen can proceed during one touch sensing interval corresponding to a blank period.

As another example, as shown in FIG. 5, a time interval corresponding to one display frame (hereinafter referred to as a 'display frame period' for convenience of description) can be divided into two or more display intervals and two or more touch sensing intervals. In this case, display driving is performed during two or more display intervals within one display frame period 500, and during two or more touch sensing intervals, touch driving for sensing a touch input by an object (e.g., a finger or an active pen) once or twice or more can be performed in the entire area or in some areas of the screen.

As such, when display driving and the touch driving are performed by dividing one display frame period 500 into two or more display intervals and two or more touch sensing intervals, each of two or more blank periods corresponding to two or more touch sensing intervals within one display frame period 500 can be referred to as "long horizontal blank (LHB)".

For example, two or more periods in which touch sensing is performed for an object (e.g., an active pen or a finger) within the display frame period 500 can be referred to as an LHB or a touch sensing interval. For example, touch driving performed during two or more LHBs within one display frame period can be referred to as LHB driving. For example, as shown in FIG. 5, when 16 display intervals and 16 touch sensing intervals are alternately and repeatedly performed within one display frame period 500, the 16 touch sensing intervals can be referred to as LHB #1(501), LHB #2 (502), LHB #3 (503), . . . , LHB #16 (516), respectively.

According to various embodiments, the number of display intervals or the number of touch sensing intervals repeated within the one display frame period 500 can change according to the display frame. For example, 17 display intervals and 17 touch sensing intervals can be alternately and repeatedly performed within one display frame period 500, and the number of times can be variously changed.

Hereinafter, with reference to FIGS. 6 to 10, embodiments in which a touch frame is set differently depending on whether an object (e.g., an active pen) is touched will be described.

Figure 6:
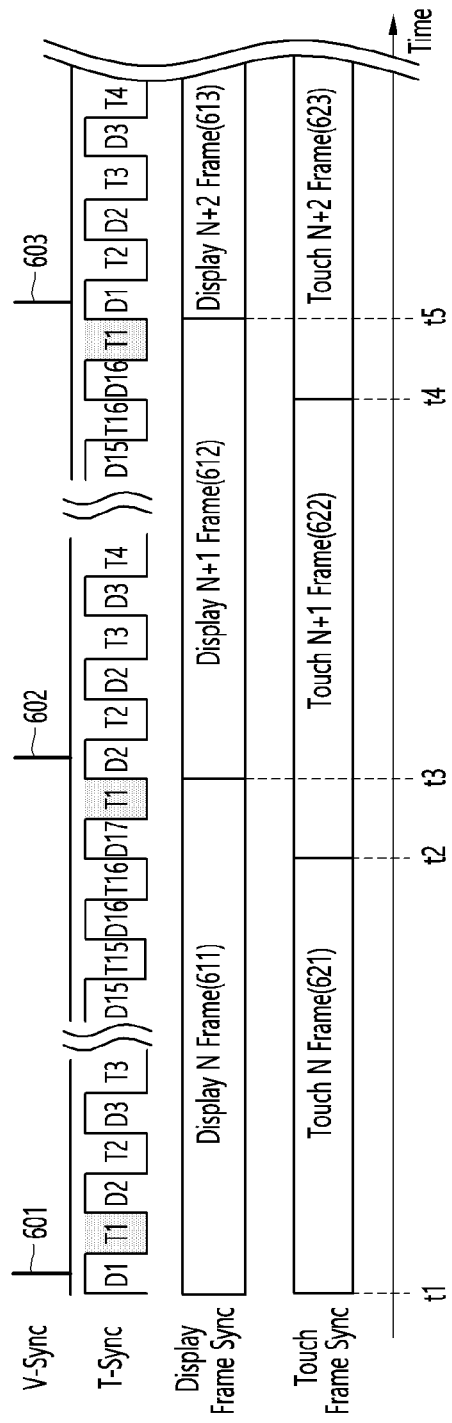
FIG. 6 is a diagram illustrating a touch frame set by a touch synchronization count matching mode according to an embodiment.

FIG. 6 is a diagram illustrating a touch frame set by a touch synchronization count matching mode according to an embodiment.

Referring to FIG. 6, display frames can be divided based on a vertical synchronization signal (V-Sync). For example, the Nth display frame 611 can start according to the first vertical synchronization signal 601, the N+1th display frame 612 can start according to the second vertical synchronization signal 602, and the N+2th display frame 613 can start according to the third vertical synchronization signal 603. The Nth display frame 611 can start at t1, the N+1th display frame 612 can start at t3, and the N+2th display frame 613 can start at t5.

According to an embodiment, the number of LHBs constituting a touch frame can be set in advance to identify an object (e.g., an active pen). For example, 16 LHBs can be set in one touch frame. According to the embodiment, the active pen can communicate with the touch sensing device according to a predetermined specific communication protocol (e.g., MPP protocol, WGP protocol, or AES protocol). In order for the touch sensing device to normally communicate with the active pen according to the specific communication protocol, the time interval of the touch frame can have a certain size.

In this way, when the touch frame is fixed to a certain size, it may not match the display frame dividing the frame based on the vertical synchronization signal as described above. According to an embodiment, as shown in FIG. 6, a mode for constituting a touch frame based on a touch synchronization signal according to a communication protocol for an active pen is referred to as a 'T-Synchronization Count Matching Mode', but is not limited to the above term.

Hereinafter, the touch synchronization count matching mode will be referred to as a 'second matching mode' for convenience of explanation.

According to the embodiment, in order for the touch sensing device to normally communicate with the active pen, the time interval of 1 LHB can be fixed, and the number of touch synchronization signals Tsync can be greater than the number of LHBs (e.g., 16) determined within one display frame. For example, when the refresh rate is set to 60 Hz, 16 LHBs can be included in one display frame, but 17 LHBs can be included in a specific display frame. Referring to FIG. 6, the N+1th display frame 612 can comprise 16 display driving intervals (or display intervals) (D1, D2, . . . , D16) and 16 touch driving intervals (or touch sensing intervals) (T1, T2, . . . , T16). In contrast, the Nth display frame 611 can comprise 17 display driving intervals (or display intervals) (D1, D2, . . . , D17) and 17 touch driving intervals (or touch sensing intervals) (T1, T2, . . . , T16, and T1).

According to an embodiment, when the touch frame operates with the number of LHBs (e.g., 16) determined in consideration of the communication protocol for the active pen, the display frame and the touch frame may not match as shown in FIG. 6. For example, the display frame can be set to comprise 17 display driving intervals so that it can be transitioned to the next display frame at t3, but the touch frame can be set to comprise 16 touch drive periods according to a communication protocol related to the active pen so that it can be transitioned to the next touch frame at t2.

As such, a situation in which the display frame and the touch frame do not match each other can occur. For example, the Nth touch frame 621 does not match the Nth display frame 611, the N+1th touch frame 622 does not match the N+1th display frame 612, and the N+2th touch frame 623 does not match the N+2th display frame 613.

According to an embodiment, display noise can occur because touch sensing data is different between a case where the display frame and the touch frame match each other and a case where they do not match each other. For example, as the number of LHBs included in one display frame increases every few seconds, synchronization between the display frame and the touch frame is out of sync every few seconds. Thus, the area where display noise occurs can change. Accordingly, all display areas can be vulnerable to display noise. In this way, if the display noise is severe, a ghost touch can be induced in sensing the touch, which can cause a malfunction of the touch.

Figure 7:
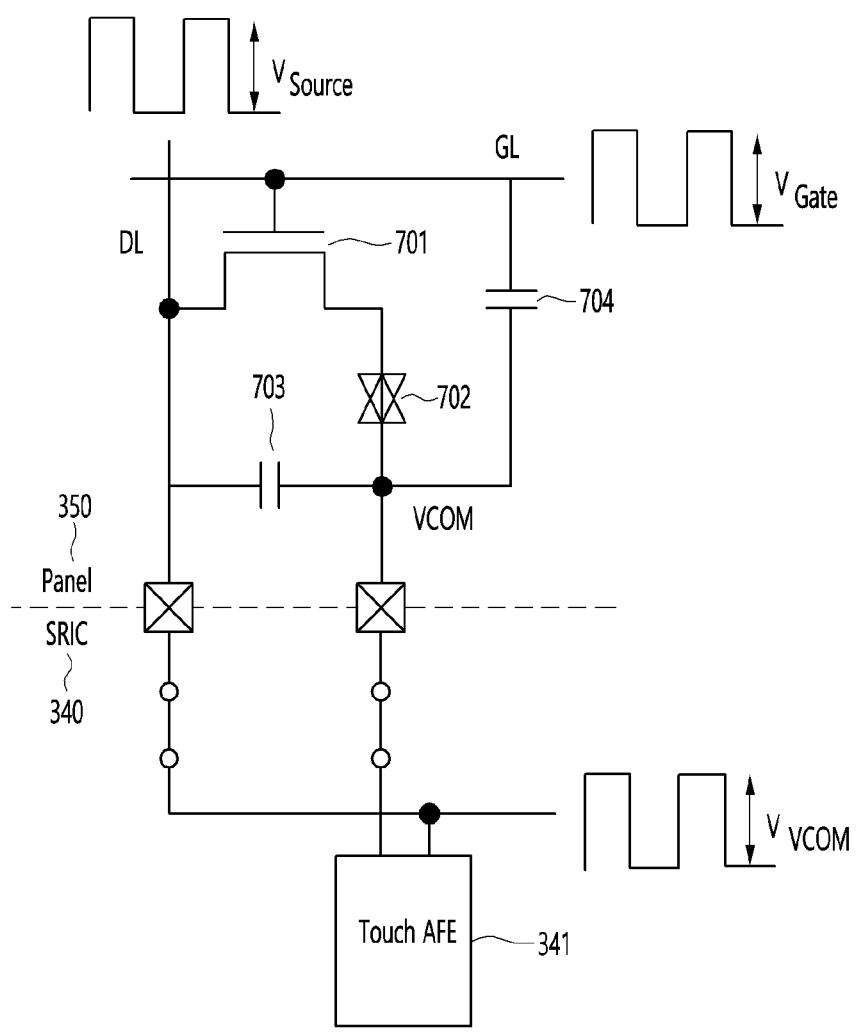
FIG. 7 is a diagram illustrating a concept of generation of display noise according to an embodiment.

FIG. 7 is a diagram illustrating a concept of generation of display noise according to an embodiment.

Referring to FIG. 7, a panel 350 can comprise a plurality of pixels P. According to an embodiment, each pixel P can comprise a transistor (e.g., TFT) 701 and a liquid crystal (LC) 702 and a common voltage electrode (VCOM). The gate terminal of the transistor (TFT) 701 can be connected to the gate line GL, the drain terminal can be connected to the data line DL, and the source terminal can be connected to the liquid crystal (LC) 702. A first parasitic capacitor 703 can exist between the data line DL and VCOM, and a second parasitic capacitor 704 can exist between the gate line GL and VCOM.

According to the embodiment, when the scan signal SCAN (e.g., the gate voltage $V_{Gate}$) corresponding to the turn-on voltage is supplied to the gate terminal of the transistor 701 through the gate line GL, the drain terminal of the transistor 701 and the source terminal can be conductive, and the data voltage $V_{Source}$ supplied through the data line DL can be supplied to the liquid crystal (LC) 702. A common voltage can be supplied to the common voltage electrode VCOM, and the brightness of the pixel P can be adjusted while the liquid crystal (LC) 702 is controlled according to the difference between the common voltage and the data voltage $V_{Source}$.

As described above with reference to FIG. 3, the touch driving signal $V_{VCOM}$ can be input to the touch panel, and the touch driving signal can share the common voltage electrode VCOM with a common voltage. The touch AFE 341 can determine whether or not a touch has been made based on a signal sensed from the panel 350. As such, when the display frame and the touch frame do not match as the touch driving signal shares the common voltage electrode VCOM with the common voltage, display noise (e.g., gate in panel (GIP) noise) can be generated along the connection direction of the gate terminal.

According to various embodiments, in an embodiment to be described later, in a state in which a touch of an object (e.g., active pen) is confirmed, a touch frame can be determined according to a communication protocol (e.g., communication standard) for the object (e.g., active pen). In a state where the touch of an object (e.g., active pen) is not confirmed, display noise can be reduced by matching the touch frame and the display frame regardless of a communication protocol for the object (e.g., active pen). They will be described later. In an embodiment to be described later, a mode for matching a touch frame and a display frame can be referred to as a 'V-Sync Matching Mode', but the term is not limited thereto. For convenience of description, the vertical synchronization matching mode will be referred to as a 'first matching mode'. In addition, in the description to be described later, an active pen is described as an example of an object, but is not limited thereto.

Figure 8:
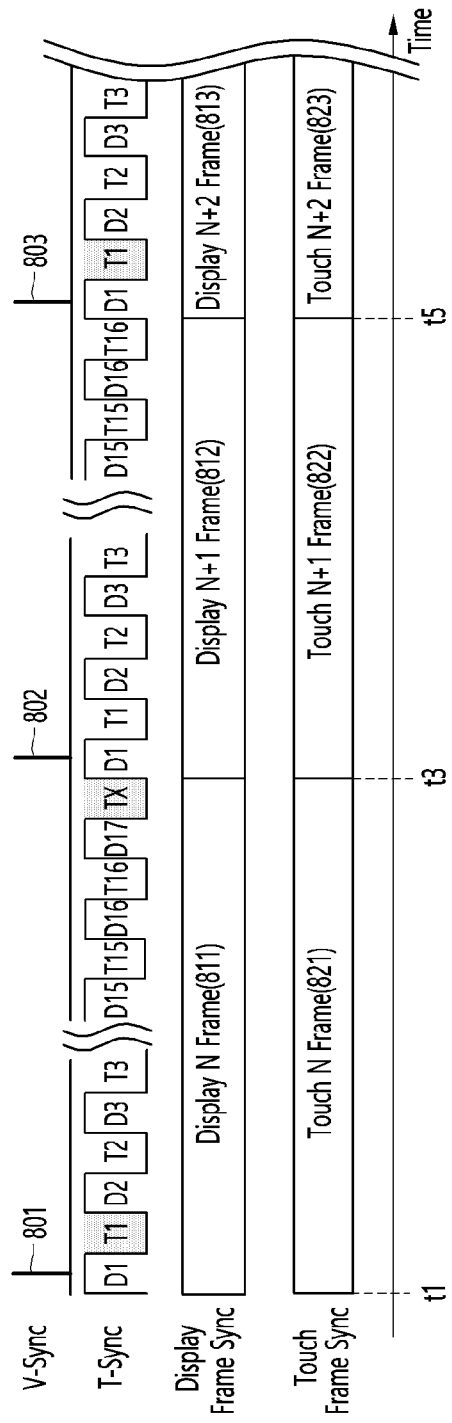
FIG. 8 is a diagram illustrating a touch frame set by a vertical synchronization matching mode according to an embodiment.

FIG. 8 is a diagram illustrating a touch frame set by a vertical synchronization matching mode according to an embodiment.

Referring to FIG. 8, according to an embodiment, the touch sensing device can set a touch frame using a vertical synchronization matching mode. For example, according to the vertical synchronization matching mode, a display frame and a touch frame can be matched with each other.

According to an embodiment, display frames can be divided based on a vertical synchronization signal (V-Sync). For example, the Nth display frame 811 can start according to the first vertical synchronization signal 801, the N+1th display frame 812 can start according to the second vertical synchronization signal 802, and the N+2th display frame 813 can start according to the third vertical synchronization 803. The Nth display frame 811 can start at t1, the N+1th display frame 812 can start at t3, and the N+2th display frame 813 can start at t5.

According to an embodiment, the touch frame can be set to be matched with the display frame according to the vertical synchronization matching mode. For example, the Nth touch frame 821 can match the Nth display frame 811, the N+1th touch frame 822 can match the N+1th display frame 812, and the N+2 touch frame 823 can match the N+2th display frame 813. When the touch of the active pen is not confirmed, the touch sensing device can reduce display noise by matching the touch frame with the display frame independently of a communication protocol related to the active pen.

According to the embodiment, as described above, the number of display intervals or the number of touch sensing intervals repeated within one display frame can be changed according to the display frame. For example, 17 display intervals and 17 touch sensing intervals can be alternately and repeatedly performed within one display frame period, and the number of times can be variously changed.

For example, referring to FIG. 8, the Nth display frame 811 can comprise 17 display driving intervals (or display intervals) (D1, D2, . . . , D17) and 17 touch driving intervals (or touch sensing intervals) (T1, T2, . . . , T16, and TX), and the N+1th display frame 812 can comprise 16 display driving intervals (or display intervals) (D1, D2, . . . , D16) and 16 touch driving intervals (or touch sensing intervals) (T1, T2, . . . , T16). As described above, according to the vertical synchronization matching mode, the Nth touch frame 821 can be matched with the Nth display frame 811, and the N+1th touch frame 822 can be matched with the N+1th display frame 812.

Therefore, compared to the touch sync count matching mode of FIG. 6, TX can be set instead of T1 after D17 within the time interval of the Nth display frame 811. The TX period can be a dummy interval in which touch is not sensed. Accordingly, the N+1th display frame 812 and the N+1th touch frame 822 can start in a state matched with each other, and the N+1th display frame 812 can be set in the order of D1, T1, D2, T2, . . . , D16, and T16 again.

According to an embodiment, as shown in FIG. 8, in a state in which the touch of the active pen is not confirmed, display noise can be reduced by setting the touch frame to match the display frame based on the vertical synchronization matching mode (first matching mode) instead of the touch synchronization count matching mode (second matching mode).

Figure 9:
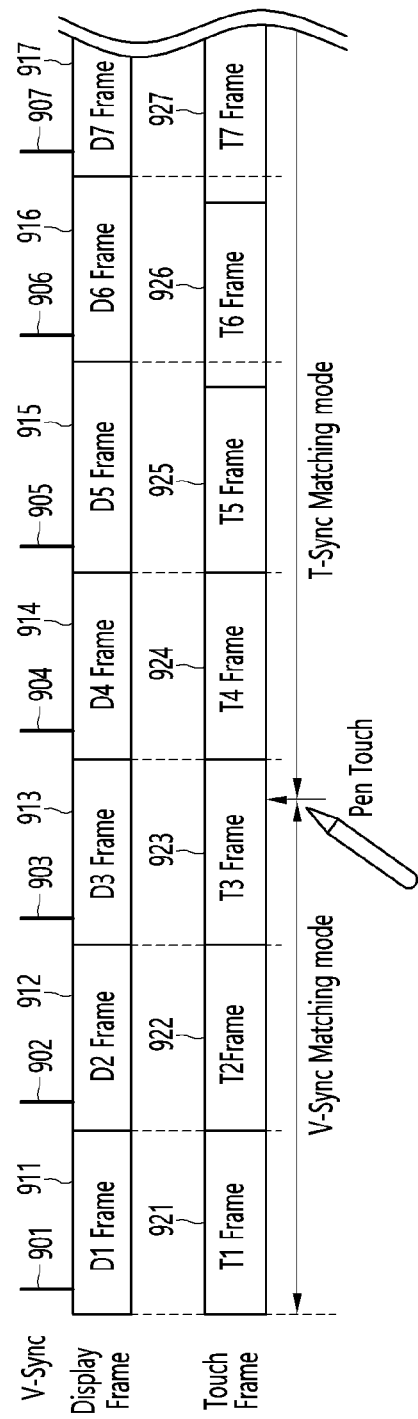
FIG. 9 is a diagram illustrating conversion of a matching mode according to an embodiment.

FIG. 9 is a diagram illustrating conversion of a matching mode according to an embodiment.

Referring to FIG. 9, a display frame can be set based on a synchronization signal (e.g., a vertical synchronization signal (V-Sync)). For example, the D1 frame 911 can be set according to the first vertical synchronization signal 901, the D2 frame 912 can be set according to the second vertical synchronization signal 902, the D3 frame 913 can be set according to the third vertical synchronization signal 903, the D4 frame 914 can be set according to the fourth vertical synchronization signal 904, the D5 frame 915 can be set according to the fifth vertical synchronization signal 905, the D6 frame 916 can be set according to the sixth vertical synchronization signal 906, and the D7 frame 917 can be set according to the seventh vertical synchronization signal 907.

According to an embodiment, in a state in which the touch of the active pen is not confirmed, a touch frame can be set based on a vertical synchronization matching mode (e.g., a first matching mode). For example, during a period in which the touch of the active pen is not confirmed, the T1 frame 921 can match the D1 frame 911, the T2 frame 922 can match the D2 frame 912, and the T3 frame 923 can match the D3 frame 913. According to an embodiment, an integrated circuit (e.g., a touch driving circuit) that generates a touch driving signal can generate a touch driving signal based on a touch frame set according to the vertical synchronization matching mode. For example, as shown in FIG. 8, a touch driving signal (e.g., an uplink signal) for sensing a touch of a hand or an active pen in a specific LHB set in a touch frame can be generated.

Thereafter, when the touch of the active pen is confirmed in a specific touch sensing interval of the T3 frame 923, the mode can be changed from the vertical synchronization matching mode (e.g., the first matching mode) to the touch synchronization count matching mode (e.g., the second matching mode). As the mode is changed to the touch sync count matching mode, the T4 frame 924, the T5 frame 925, the T6 frame 926, and the T7 frame 927 can be set according to the communication protocol regardless of the display frame. For example, according to the mode conversion, the T4 frame 924, the T5 frame 925, the T6 frame 926, and the T7 frame 927 can be set according to a communication protocol related to the active pen.

When operating in the touch synchronization count matching mode, as described above with reference to FIG. 6, as the length of a specific display frame increases, synchronization between the display frame and the touch frame can be inconsistent. For example, the D4 frame 914 can comprise 16 display driving intervals (or display intervals) (D1, D2, . . . , D16) and 16 touch driving intervals (or touch sensing intervals) (T1, T2, . . . , T16). Thus, synchronization between the display frame and the touch frame can be matched even when operating in the touch synchronization count matching mode. On the other hand, the D5 frame 915 can comprise 17 display driving intervals (or display intervals) (D1, D2, . . . , D16, D17) and 17 touch driving intervals (or touch sensing intervals) (T1, T2, . . . , T16, TX), and synchronization between the display frame and the touch frame can be inconsistent. Thereafter, even of the D6 frame 916 comprises 16 display driving intervals (or display intervals) (D1, D2, . . . , D16) and 16 touch driving intervals (or touch sensing intervals) (T1, T2, . . . , T16), synchronization between the display frame and the touch frame can continue to be mismatched.

According to an embodiment, an integrated circuit (e.g., a touch driving circuit) that generates a touch driving signal can generate a touch driving signal based on a touch frame set according to the touch synchronization count matching mode. For example, as shown in FIG. 6, a touch driving signal (e.g., an uplink signal) for sensing a touch of a hand or an active pen can be generated in a specific LHB set in a touch frame. According to an embodiment, as the integrated circuit generates a touch driving signal according to the touch synchronization count matching mode, the touch driving signal can be generated at a time interval corresponding to a predetermined first cycle (e.g., a period according to a communication protocol set for an active pen).

According to an embodiment, when confirming that the touch of the active pen is released, the touch sensing device can change from the touch sync count matching mode (e.g., second matching mode) to the vertical sync matching mode (e.g., first matching mode) again. Accordingly, generation of display noise can be reduced by re-matching the display frame and the touch frame in a period where the touch of the active pen is not confirmed. For example, an integrated circuit (e.g., a touch driving circuit) that generates a touch driving signal can generate a touch driving signal based on a touch frame set according to the re-changed vertical synchronization matching mode. For example, as shown in FIG. 8, a touch driving signal (e.g., an uplink signal) for sensing a touch of a hand or an active pen in a specific LHB set in a touch frame can be generated.

Figure 10:
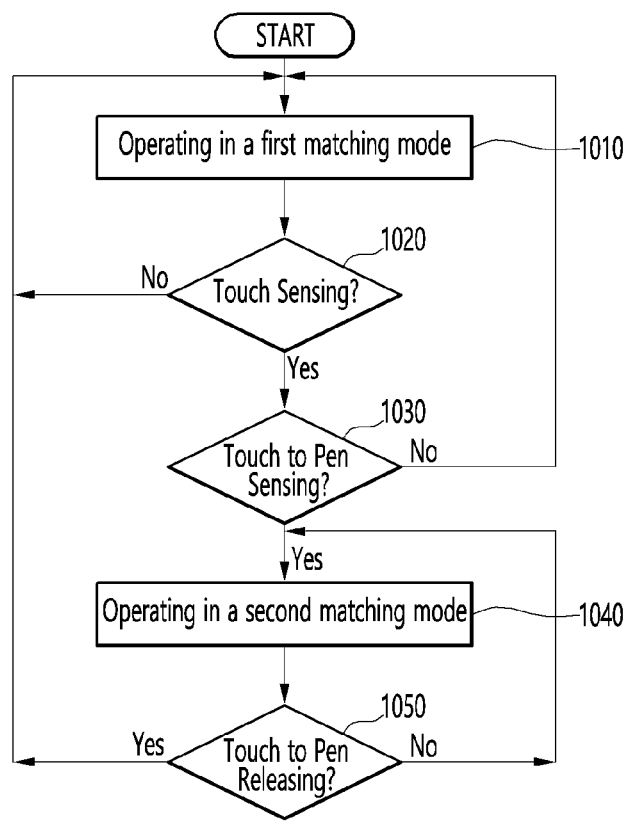
FIG. 10 is a flowchart illustrating a touch sensing method according to an embodiment.

FIG. 10 is a flowchart illustrating a touch sensing method according to an embodiment. Referring to FIG. 10, the touch sensing device can operate in a first matching mode (e.g., vertical synchronization matching mode) (Step 1010). While operating in the first matching mode, the touch sensing device can confirm that a touch is sensed in a touch sensing interval while operating in the first matching mode (step 1020). As a result of the confirmation, if it is confirmed that the touch is not sensed, the first matching mode can be continuously maintained. For example, in a state where a touch is not sensed, the touch sensing device can set the touch frame to match the display frame.

According to the embodiment, when it is determined that the touch is sensed as a result of the confirmation in step 1020, it can be determined whether the touch is caused by the active pen (step 1030). As a result of the confirmation, when it is confirmed that the touch is not caused by the active pen (For example, when confirmed as a touch by a hand or finger), the first matching mode can be continuously maintained and the confirmed touch can be processed.

According to an embodiment, when it is confirmed as a touch by an active pen as a result of the confirmation in step 1030, the touch sensing device can operate by changing from the first matching mode to the second matching mode (step 1040). For example, the touch sensing device can set the touch frame according to a communication protocol related to the active pen without matching the touch frame with the display frame.

According to an embodiment, when it is confirmed that the touch of the active pen is released, the touch sensing device can operate by changing from the second matching mode to the first matching mode again (step 1050). For example, in a state in which the touch of the active pen continues, the touch sensing device can operate while continuously maintaining the second matching mode.

As described above, according to the embodiment, in a state in which the touch of an object (e.g., active pen) is confirmed, a touch frame is determined according to a communication protocol for the object (e.g., active pen), and in a state where the touch of an object (e.g., active pen) is not confirmed, the touch frame and the display frame are matched to each other regardless of the communication protocol for the object (e.g., active pen) so that display noise can be reduced.

What is claimed is:

1. A touch sensing device, comprising:
   a touch driving circuit configured to output a touch driving signal to a touch electrode to sense an object,
   wherein the touch driving circuit is configured:
   to output a first touch driving signal based on a first touch frame adjusted according to a first matching mode during a period before touch of the object is not confirmed; and
   to change the first matching mode to a second matching mode to output a second touch driving signal based on a second touch frame adjusted according to the second matching mode during a period from when the touch of the object is confirmed until the touch of the object is released,
   wherein, in the first matching mode, a starting time point of the first touch frame is identical to a starting time point of a first display frame which is set based on a vertical synchronization signal, and
   wherein, in the second matching mode, a starting time point of the second touch frame is earlier than a starting time point of a second display frame.

2. The touch sensing device of claim 1, wherein the touch driving circuit is configured to determine the starting time point of the second touch frame based on the number of long horizontal blanks (LHBs) during a period in which the touch of the object is confirmed.

3. The touch sensing device of claim 1, wherein the touch driving circuit is configured to change the second matching mode to the first matching mode to output a third touch driving signal based on a third touch frame adjusted according to the first matching mode during a period after the touch of the object is released.

4. The touch sensing device of claim 1, wherein the object comprises an active pen.

5. A touch sensing method, comprising:
   outputting a first touch driving signal based on a first touch frame adjusted according to a first matching mode during a period before touch of an object is not confirmed; and
   changing the first matching mode to a second matching mode to output a second touch driving signal based on a second touch frame adjusted according to the second matching mode during a period from when the touch of the object is confirmed until the touch of the object is released,
   wherein, in the first matching mode, a starting time point of the first touch frame is identical to a starting time point of a first display frame set based on a vertical synchronization signal, and
   wherein, in the second matching mode, a starting time point of the second touch frame is earlier than a starting time point of a second display frame.

6. The touch sensing method of claim 5, comprising:
   determining the starting time point of the second touch frame based on the number of long horizontal blanks (LHBs) during a period in which the touch of the object is confirmed.

7. The touch sensing method of claim 5, comprising:
   changing the second matching mode to the first matching mode to output a third touch driving signal based on a third touch frame adjusted according to the first matching mode during a period after the touch of the object is released.

8. The touch sensing method of claim 5, wherein the first object comprises an active pen.

9. A display device, comprising:
   a panel comprising touch electrodes that output sensing signals to sense an object;
   a touch control circuit configured to control a first touch frame adjusted according to a first matching mode during a period before touch of the object is not confirmed and change the first matching mode to a second matching mode to output a second touch frame adjusted according to the second matching mode during a period from when the touch of the object is confirmed until the touch of the object is released; and
   a driving signal output circuit configured to output a first touch driving signal based on the first touch frame during the period before the touch of the object is not confirmed and output a second touch driving signal based on the second touch frame during the period from when the touch of the object is confirmed until the touch of the object is released,
   wherein, in the first matching mode, a starting time point of the first touch frame is identical to a starting time point of a first display frame set based on a vertical synchronization signal, and
   where, in the second matching mode, a starting time point of the second touch frame is earlier than a starting time point of a second display frame.

10. The display device of claim 9, wherein the touch control circuit is configured to determine the starting time point of the second touch frame based on the number of long horizontal blanks (LHBs) during a period in which the touch of the object is confirmed.

11. The touch sensing device of claim 1, wherein a time interval of the first touch frame is identical to a time interval of the first display frame.

12. The touch sensing device of claim 1, wherein an end time point of the first touch frame is identical to an end time point of the first display frame.

13. The touch sensing device of claim 1, wherein a time interval of the second touch frame is smaller than a time interval of the second display frame.

14. The touch sensing device of claim 1, wherein an end time point of the second touch frame is earlier than an end time point of the second display frame.

15. The touch sensing method of claim 5, wherein a time interval of the first touch frame is identical to a time interval of the first display frame.

16. The touch sensing method of claim 5, wherein an end time point of the first touch frame is identical to an end time point of the first display frame.

17. The touch sensing method of claim 5, wherein a time interval of the second touch frame is smaller than a time interval of the second display frame.

18. The touch sensing method of claim 5, wherein an end time point of the second touch frame is earlier than an end time point of the second display frame.

19. The display device of claim 9, wherein an end time point of the first touch frame is identical to an end time point of the first display frame.

20. The display device of claim 9, wherein an end time point of the second touch frame is earlier than an end time point of the second display frame.

* * * * *